US010552376B1

(12) United States Patent
Righi et al.

(10) Patent No.: US 10,552,376 B1
(45) Date of Patent: Feb. 4, 2020

(54) ACCESSING FILES STORED IN A FIRMWARE VOLUME FROM A PRE-BOOT APPLICATION

(71) Applicant: American Megatrends International, LLC, Norcross, GA (US)

(72) Inventors: Stefano Righi, Lawrenceville, GA (US); Madhan B. Santharam, Duluth, GA (US); Arun Subramanian, Duluth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 426 days.

(21) Appl. No.: 15/403,033

(22) Filed: Jan. 10, 2017

(51) Int. Cl.
*G06F 16/14* (2019.01)
*G06F 9/4401* (2018.01)

(52) U.S. Cl.
CPC .......... *G06F 16/148* (2019.01); *G06F 9/4406* (2013.01)

(58) Field of Classification Search
CPC .... G06F 9/4406; G06F 16/148; G06F 16/172; G06F 16/284; H04L 67/06; G16H 10/00
See application file for complete search history.

(56) References Cited

U.S. PATENT DOCUMENTS

| 2003/0097581 A1* | 5/2003 | Zimmer | G06F 9/4411 726/10 |
| 2005/0198487 A1* | 9/2005 | Zimmer | G06F 9/4411 713/2 |
| 2005/0283606 A1* | 12/2005 | Williams | G06F 9/4416 713/166 |
| 2011/0302444 A1* | 12/2011 | Tashima | G06F 9/4411 714/2 |

OTHER PUBLICATIONS

Zimmer, Beyond BIOS Developing with the Unified Extensible Firmware Interface Digital Edition, pp. 1-427 (Year: 2010).*
Adamw, UEFI boot: how does that actually work, then?, pp. 1-27 (Year: 2014).*
Wu, UEFI Firmware Storage System Analysis, pp. 187-191 (Year: 2016).*

* cited by examiner

*Primary Examiner* — Albert M Phillips, III
(74) *Attorney, Agent, or Firm* — Newport IP, LLC; Leonard J. Hope

(57) ABSTRACT

Standard I/O library functions for accessing files stored on mass storage devices are modified to enable access to files stored in firmware volumes. An application can be compiled against the modified standard I/O library functions to generate a pre-boot application. When the pre-boot application is executed within a pre-boot execution environment, it can utilize standard I/O library functions to access files stored in a firmware volume. In response to receiving a request to open a file from a pre-boot application, the called I/O function searches a file cross-reference table to locate the filename for the file. If the filename is in the file cross-reference table, the GUID associated with the filename is retrieved from the file cross-reference table and used to obtain a file handle to the file. The file handle can then be returned to the pre-boot application and used to perform other types of operations on the file.

20 Claims, 6 Drawing Sheets

ACCESSING FILES STORED IN A FIRMWARE VOLUME FROM A PRE-BOOT APPLICATION

BACKGROUND

In some scenarios it is desirable to port operating system ("OS")-level applications for execution in a firmware-provided pre-boot execution environment, such as that provided by a Unified Extensible Firmware Interface ("UEFI") Specification-compliant firmware. When executing an application in a pre-boot execution environment, it is also desirable for the application to be able to access files stored in a firmware volume on a firmware device rather than from a mass storage device. This enables convenient storage of the files within the same firmware device that stores the pre-boot application and removes the dependency of the application and the firmware on files stored in mass storage devices.

The American National Standards Institute ("ANSI") standard for the C programming language defines a standard set of functions for performing file-related input/output ("I/O") operations (e.g. "fopen," "fread," "fclose," etc.). This set of functions is commonly utilized by OS-level applications for accessing data on mass storage media, such as hard disk drives, Universal Serial Bus ("USB") keys, and others. This set of functions does not, however, support the utilization of files stored within a firmware volume. As a result, porting an OS-level application for execution in a pre-boot execution environment can require rewriting program code in the application that utilizes standard I/O functions to access files on mass storage devices to instead access the files from a firmware volume. Porting OS-level applications that utilize this set of functions for execution in a pre-boot execution environment can therefore be difficult and time consuming.

It is with respect to these and other considerations that the disclosure made herein is presented.

SUMMARY

Technologies are described herein for enabling pre-boot applications to access files stored in a firmware volume. Through an implementation of the technologies presented herein, standard I/O library functions can be modified in a manner that enables access to files stored on firmware volumes from pre-boot applications executing in a pre-boot execution environment. This enables an OS-level application that utilizes standard I/O functions to be ported for use in a firmware-provided pre-boot execution environment without rewriting program code in the application that utilizes standard I/O functions to access files on mass storage devices. Other technical benefits can also be realized through an implementation of the disclosed technologies.

In one particular implementation, files to be accessed by pre-boot applications are stored in a firmware volume in a firmware device. Files stored in a firmware volume might be referred to herein as firmware file system files or, more simply, files. Each file can be identified by a globally unique identifier ("GUID") stored with each file. An entry is also made for each of the files in a file cross-reference table that is also stored in the firmware device. The file cross-reference table provides a mapping between filenames for files stored in a firmware volume and the GUIDs associated with the filenames. In some configurations, the file cross-reference table can also provide a mapping between volume names for firmware volumes and GUIDs for the firmware volumes.

In some configurations, the filenames for files stored in a firmware volume are stored within or in conjunction with the files. In this configuration, the file cross-reference table can be generated by identifying the files stored in the firmware volume and adding the filenames and the GUIDs for the files stored in the firmware volume to the cross-reference table. Other mechanisms can also be utilized to create the file cross-reference table.

The implementations for standard I/O library functions that are utilized by an application to access files stored on mass storage devices are also modified in order to enable access to files stored in firmware volumes. An application can then be compiled against the modified standard I/O library functions in order to generate a pre-boot application. The application can be statically or dynamically linked to the library functions. The pre-boot application can then be stored in the firmware device.

When the pre-boot application is executed within a pre-boot execution environment, such as that provided by a UEFI Specification-compliant firmware, the pre-boot application can utilize standard I/O library functions in order to access files stored in a firmware volume. In particular, the pre-boot application can generate a function call for opening a file using a standard I/O library function, such as "fopen." Such a function call can specify a filename associated with the file to be opened.

In response to receiving a request to open a file from a pre-boot application executing in a pre-boot environment, the called I/O function searches the file cross-reference table to determine if the filename provided with the open request is specified therein. If the requested filename is not contained in the file cross-reference table, the standard I/O library function for opening a file on a mass storage device is utilized to obtain a file handle for the requested file.

If, however, the filename of the requested file is contained in the file cross-reference table, this indicates that the requested file is stored in a firmware volume rather than on a mass storage device. Accordingly, if the filename is specified in the file cross-reference table, the GUID associated with the filename is retrieved from the file cross-reference table. The GUID associated with the filename is then utilized to read a file header for the requested file from the firmware volume to obtain a file handle (which might also be referred hereto as a "file pointer") to the file.

The file handle can then be returned to the pre-boot application in response to the request to open the file. The pre-boot application can then utilize the file handle to perform other types of file operations (e.g. "fseek" or "fread") on the file stored in the firmware volume.

It is to be appreciated that the above-described subject matter can also be implemented as a computer-controlled apparatus, a computer process, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
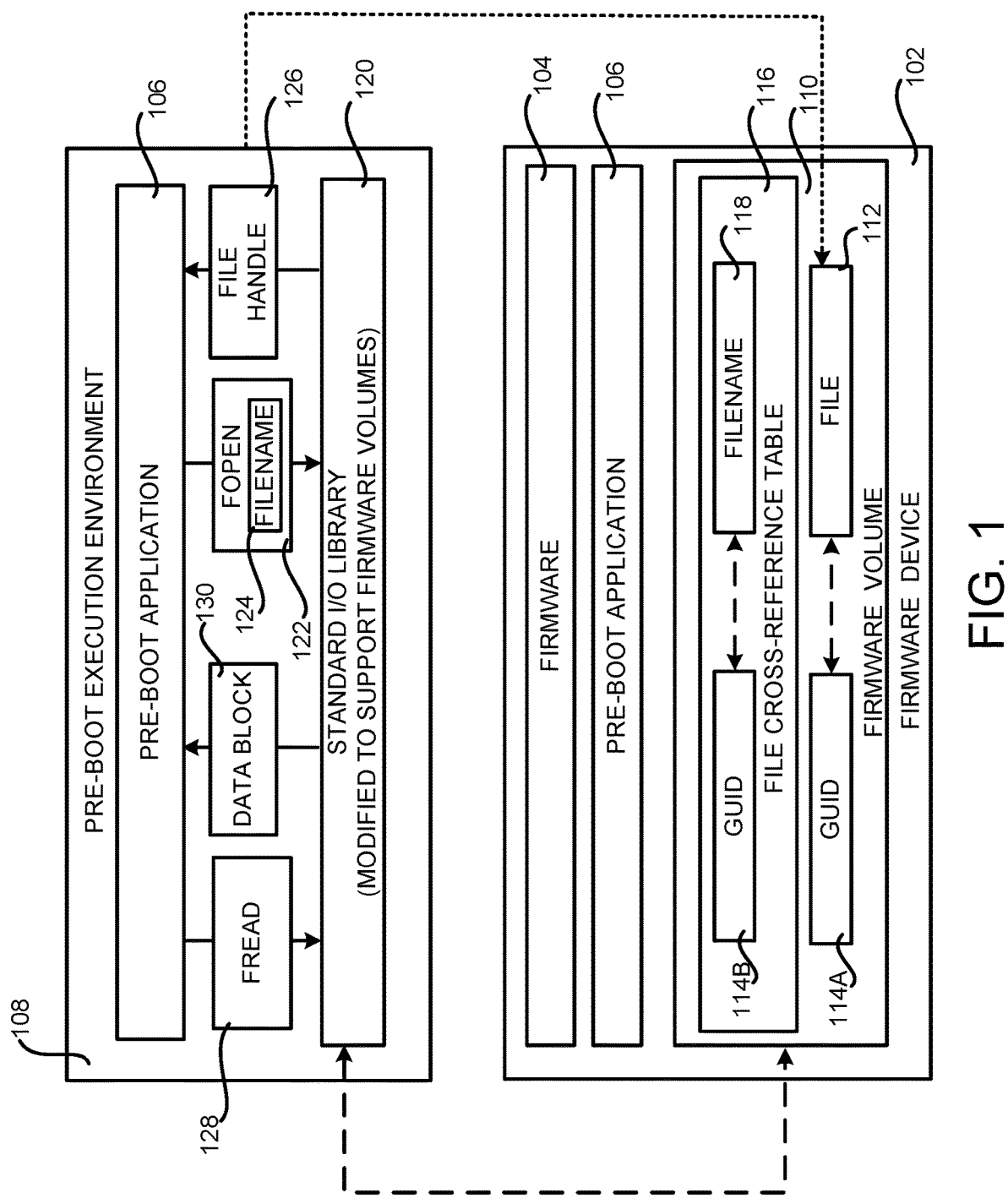
FIG. 1 is a software architecture diagram that illustrates aspects of one mechanism disclosed herein for enabling pre-boot applications to access files stored in a firmware volume.

Technologies for enabling pre-boot applications to access files stored in a firmware volume are disclosed herein. In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform particular tasks or implement particular abstract data types. Moreover, those skilled in the art will appreciate that the invention can be practiced with other computer system configurations, including handheld devices, multiprocessor systems, microprocessor-based or programmable consumer electronics, minicomputers, mainframe computers, embedded systems, and the like. Configurations presented herein can also be practiced in distributed computing environments where tasks are performed by remote processing devices that are linked through a communications network. In a distributed computing environment, program modules can be located in both local and remote memory storage devices.

FIG. 1 is a software architecture diagram that illustrates aspects of one mechanism disclosed herein for enabling a pre-boot application 106 to access files 112 stored in a firmware volume 110 of a firmware device 102. As discussed briefly above, it is common for developers to port OS-level applications (i.e. applications developed for execution upon a post-boot OS, like the WINDOWS operating system from MICROSOFT CORPORATION) for execution in a firmware-provided pre-boot execution environment 108, such as that provided by a UEFI Specification-compliant firmware. Such a firmware 104 is used as an intermediary between the hardware components of a computing system and high-level software executing on the computing system, such as an OS. The firmware 104 provides a set of software routines that boot an operating system and provide a limited set of run time services. Such a firmware 104 might be referred to herein as a UEFI Specification-compliant firmware, a UEFI-compliant firmware, a UEFI firmware, or simply a firmware.

As also discussed above, when executing an application 106 in a pre-boot execution environment 108, it can be desirable for the application 106 to be able to access files 112 stored in a firmware volume 110 on a firmware device 102 rather than from a mass storage device. This enables convenient storage of the files 112 within the same firmware device 102 that stores the pre-boot application 106 and removes the dependency of the application 106 and the firmware 104 on files stored in mass storage devices.

As further mentioned above, the ANSI standard for the C programming language defines a standard set of functions for performing file-related I/O operations (e.g. "fopen," "fread," "fclose," etc.). This set of functions is commonly utilized by OS-level applications for accessing data on mass storage media, such as hard disk drives, USB keys, and other types of devices. This set of functions does not, however, support the utilization of files stored within a firmware volume 110. As a result, porting an OS-level application for execution in a pre-boot execution environment 108 can require rewriting program code in the application that utilizes standard I/O functions to access files on mass storage devices to instead access the files from a firmware volume 110. Porting OS-level applications that utilize standard I/O functions for execution in a pre-boot execution environment 106 can therefore be difficult and time consuming.

In order to address the considerations presented above, and potentially others, functions provided by a standard I/O library 120, such as those provided by an ANSI C-compliant STDLIB, can be modified in a manner that enables access to files 112 stored on firmware volumes 110 from pre-boot applications 106 executing in a pre-boot execution environment 108 provided by a firmware 104. This enables an OS-level application that utilizes standard I/O functions to be ported for use in a firmware-provided pre-boot execution environment 106 without rewriting program code in the application that utilizes standard I/O functions to access files on mass storage devices. Other technical benefits can also be realized through an implementation of the disclosed technologies.

In order to provide this functionality, files 112 to be accessed by a pre-boot application 106 are stored in a firmware volume 110 in a firmware device 102. A firmware device 102 is a persistent physical repository that contains firmware code and/or data. The firmware device 102 is typically a flash component, but can be another type of persistent storage device. A single physical firmware device 102 can be divided into smaller pieces to form multiple logical firmware devices. Similarly, multiple physical firmware devices 102 may be aggregated into one larger logical firmware device.

A firmware volume 110 is a logical firmware device that provides a basic storage repository for firmware 104 data and/or code. Each firmware volume 110 is organized into a file system. As such, the file 112 is the base unit of storage for the firmware 104. A firmware file system ("FFS") describes the organization of files 112 and, optionally, free space within a firmware volume 110. Each FFS has a unique UEFI GUID, which can be used, for example, by the firmware 104 to associate a driver with a newly exposed firmware volume 110. Files 112 stored in a firmware volume 110 might, therefore, be referred to herein as "FFS files." Details regarding the structure and format of a GUID (and other details regarding the initialization and operation of a UEFI-compliant firmware) can be found in the Platform Initialization ("PI") Specification, which is available from the UEFI Form and which is expressly incorporated herein by reference in its entirety.

Each file 112 can be identified by a UEFI GUID 114A stored with each file 112. Similarly, each firmware volume 110 can also be identified by a UEFI GUID (not shown in FIG. 1). As known to those skilled in the art, a UEFI GUID 114 is a 128-bit integer number used to uniquely identify resources in a UEFI-compliant firmware 104. Other types of unique identifiers can also be utilized in other configurations. Additional details regarding the configuration and layout of the firmware device 102, the firmware volume 110, and the file 112 can be found in Volume 3 of the PI Specification, which is entitled "Platform Initialization Shared Architectural Elements."

In order to enable the functionality disclosed herein, an entry is also made for each of the files 112 in the firmware volume 110 that are to be accessed by the pre-boot application 106 in a file cross-reference table 116 that is also stored in the firmware device 102 in one configuration. As discussed briefly above, the file cross-reference table 116 provides a mapping between filenames 118 for files 112 stored in a firmware volume 110 and the GUIDs 114B associated with the filenames 118. In some configurations, the file cross-reference table 116 can also provide a mapping between volume names for firmware volumes 110 and GUIDs for the firmware volumes 110.

In some configurations, a development environment is utilized to add the entries to the file cross-reference table 116 at build time of the firmware 104. In another configuration, the file cross-reference table 116 is generated at a runtime of the firmware 104. In this configuration, the filenames 118 for files 112 stored in a firmware volume 110 are stored within or in conjunction with the files 112 themselves. For example, and without limitation, the filename 118 can be stored in a UI section of an FFS file 112. In this configuration, the file cross-reference table 116 can be generated at runtime of the firmware 104 by identifying the files 112 stored in the firmware volume 110 and adding the filenames 118 and the GUIDs 114A for the files 112 stored in the firmware volume 110 to the cross-reference table 116. Other mechanisms can also be utilized to create the file cross-reference table 116 at build or runtime of the firmware 104.

The implementations of standard I/O library 120 functions that are utilized by an application to access files stored on mass storage devices are also modified in order to enable access to files 112 stored in firmware volumes 110. The source code for such an application can then be compiled against the modified standard I/O library functions in order to generate a pre-boot application 106 capable of accessing files stored in a firmware volume 110. The application can be statically or dynamically linked (dynamic linking is shown in FIG. 1 for ease of illustration) to the functions provided by the standard I/O library 120. The pre-boot application 106 can then be stored in the firmware device 102. Although not illustrated in FIG. 1, the pre-boot application can also be stored in a firmware volume.

When the pre-boot application 106 is executed within a pre-boot execution environment 108, such as that provided by a UEFI Specification-compliant firmware 104, the pre-boot application 106 can utilize functions provided by a standard I/O library 120 that has been modified to permit access to files 112 stored in a firmware volume 110. In particular, the pre-boot application 106 can generate a function call 122 for opening a file 112 using a function provide by a standard I/O library 120, such as "fopen." Such a function call can specify a filename 124 associated with the file 122 to be opened.

In response to receiving a request to open a file 112 from a pre-boot application 106 executing in a firmware-provided pre-boot environment 108, the called I/O function searches the file cross-reference table 116 to determine if the filename 124 provided with the open request is specified therein. If the requested filename 124 is not contained in the file cross-reference table 116, the standard I/O library function for opening a file on a mass storage device (not shown in FIG. 1) is utilized to attempt to obtain a file handle for the requested file. Storage operations can then be performed on the file on the mass storage device using the provided file handle.

If, however, the filename 124 of the requested file is contained in the file cross-reference table 116 (i.e. the filename 124 matches the filename 118 in the example shown in FIG. 1), this indicates that the requested file 112 is stored in a firmware volume 110 rather than on a mass storage device. Accordingly, if the filename 124 is listed in the file cross-reference table 116, the GUID 114B associated with the filename 118 is retrieved from the file cross-reference table 116. The GUID 114B associated with the filename 118 is then utilized to read a header for the requested file 112 from the firmware volume 110 and to obtain a file handle 126 (which might also be referred hereto as a "file pointer") to the file 112. In particular, the GUID is used to scan the firmware volume to read the firmware file system header for the file in order to create a structure in memory that includes reference information (i.e. the file handle) to enable reading the content of the file or performing other types of file operations in subsequent calls. A file handle is a structure maintained in memory in order to preserve information for allowing further access to the file content.

The file handle 126 can then be returned to the pre-boot application 106 in response to the request to open the file 112 (i.e. the call to the fopen function in the example shown in FIG. 1). The pre-boot application 106 can then utilize the file handle 126 to perform other types of file operations (e.g. "fseek" or "fread") on the file 112 stored in the firmware volume 110 in a traditional fashion. For example, and without limitation, the pre-boot application 106 can issue an "fread" request 128 using the standard I/O library 120. The fread request 128 includes the file handle 126. In response to such a request, a data block 130 will be read from the file 112 and returned to the pre-boot application. Other types of file operations can also be performed in a similar manner that utilize the file handle 126 to identify the file 112 in the firmware volume 112 to be accessed. Additional details regarding this process will be provided below with regard to FIGS. 2A and 2B.

Figure 2A:
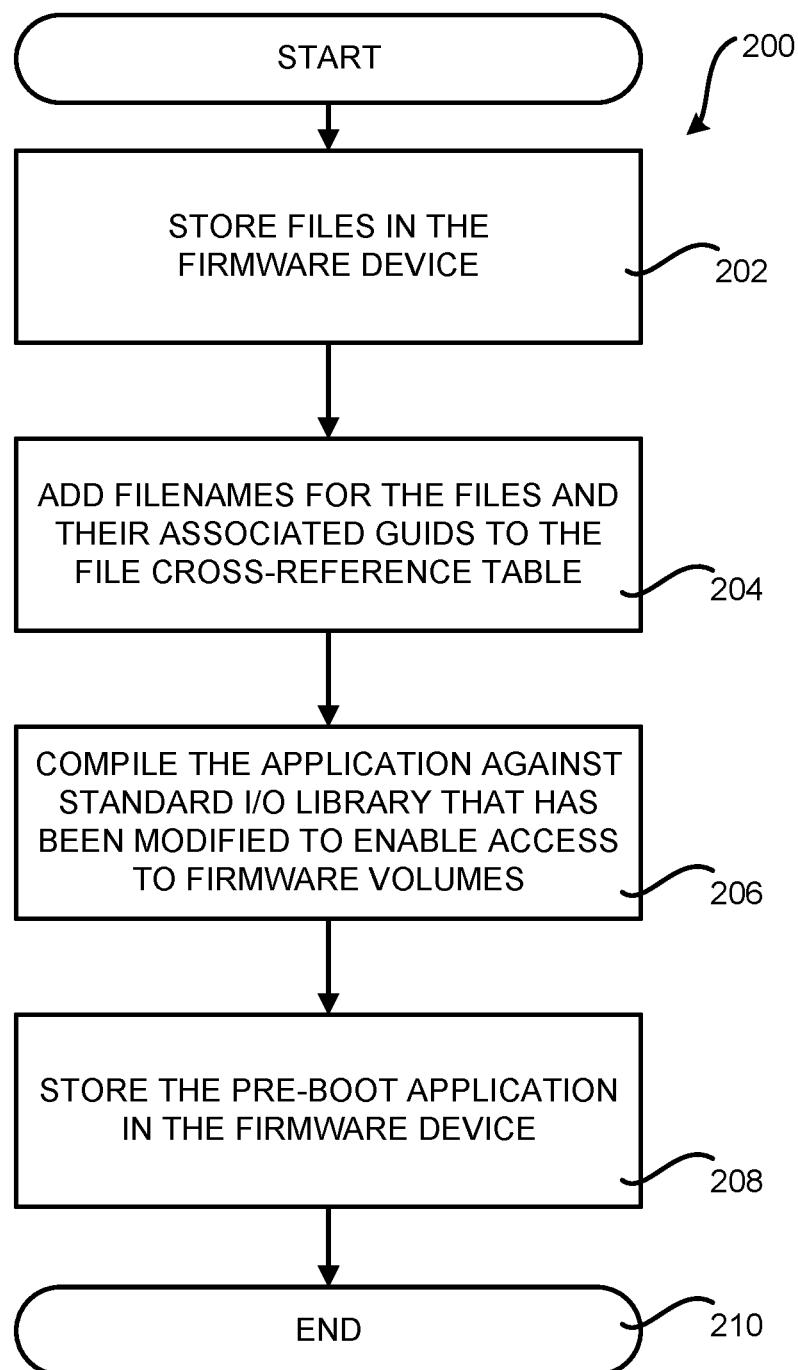
FIG. 2A is a flow diagram that illustrates aspects of one mechanism disclosed herein for configuring a firmware device and a pre-boot application for accessing files stored in a firmware volume.

FIG. 2A is a flow diagram showing a routine 200 that illustrates aspects of one mechanism disclosed herein for configuring a firmware device 102 and a pre-boot application 106 for accessing files 112 stored in a firmware volume 110. It should be appreciated that the logical operations described herein with regard to FIG. 2A and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the files 112 to be accessed by a pre-boot application 106 are stored in a firmware volume 110 in a firmware device 102. A suitable development environment can be utilized to cause the files 112 to be stored in the firmware volume 110. From operation 202, the routine 200 proceeds to operation 204.

At operation 204, an entry is made for each of the files 112 in the firmware volume 110 that are to be accessed by the pre-boot application 106 in the file cross-reference table 116. As discussed above, the file cross-reference table 116 provides a mapping between filenames 118 for files 112 stored in a firmware volume 110 and the GUIDs 114B associated with the filenames 118. In some configurations, the file cross-reference table 116 can also provide a mapping between volume names for firmware volumes 110 and GUIDs for the firmware volumes 110. As also discussed above, a suitable development environment can be utilized to add the entries to the file cross-reference table 116 at build time of the firmware 104. The file cross-reference table 116 can also be generated at a runtime of the firmware 104 in the manner described above. From operation 204, the routine 200 proceeds to operation 206.

At operation 206, the source code for an application is compiled against the modified standard I/O library functions in order to generate a pre-boot application 106 capable of accessing files 112 stored in the firmware volume 110. As discussed above, the application can be statically or dynamically linked to the functions provided by the standard I/O library 120. From operation 206, the routine 200 proceeds to operation 208.

At operation 208, the pre-boot application 106 is stored in the firmware device 102, also using a suitable development environment. The routine 200 then proceeds from operation 208 to operation 210, where it ends.

Figure 2B:
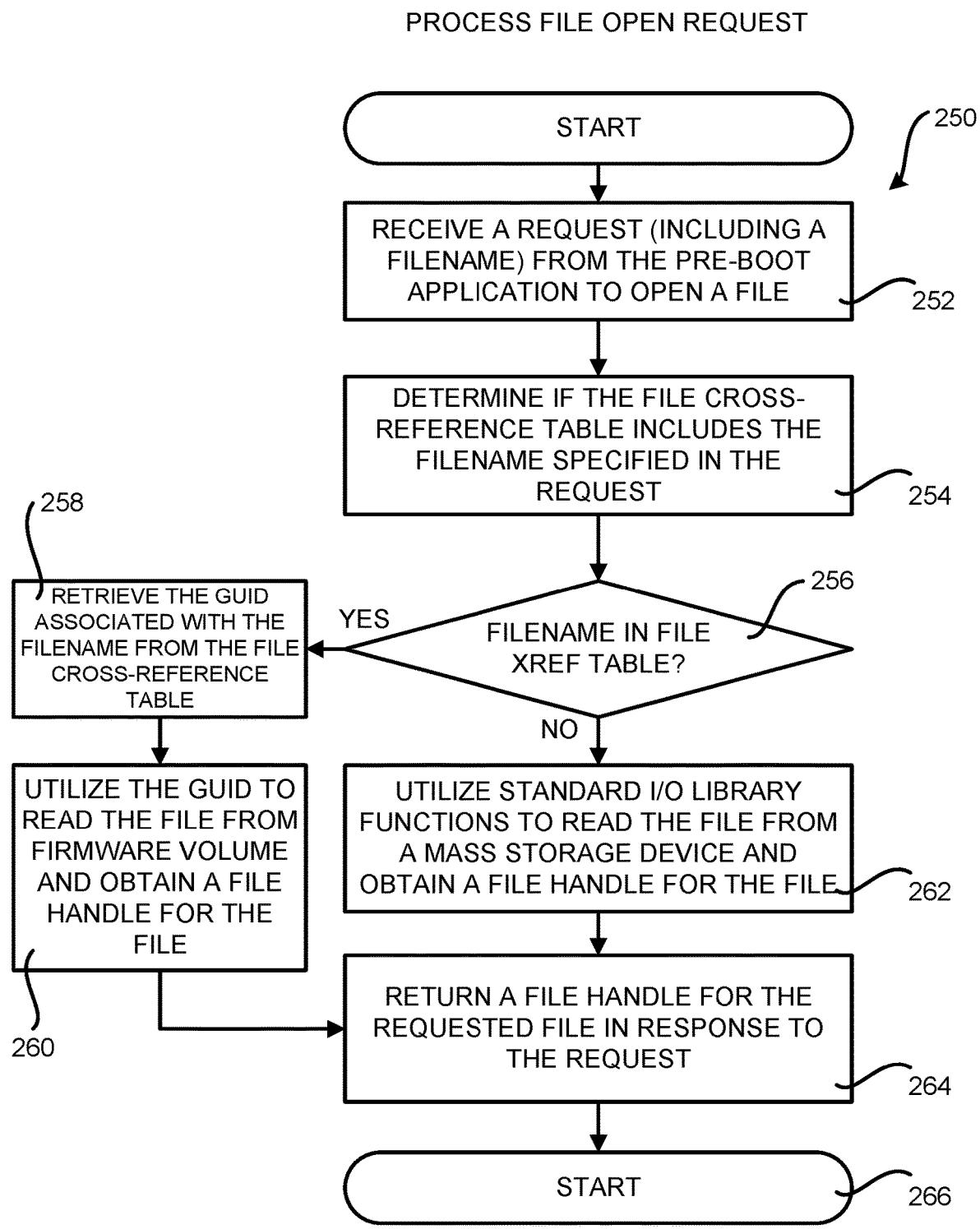
FIG. 2B is a flow diagram that illustrates aspects of one mechanism disclosed herein for processing a file open request in order to enable a pre-boot application to access files stored in a firmware volume.

FIG. 2B is a flow diagram showing a routine 250 that illustrates aspects of one mechanism disclosed herein for processing a file open request 122 (i.e. fopen) in order to enable a pre-boot application 106 to access files 112 stored in a firmware volume 110. The routine 250 begins at operation 252, where the pre-boot application 106 generates a function call 122 for opening a file 112 using a function provide by a standard I/O library 120, such as "fopen." As mentioned above, such a function call can specify a filename 124 associated with the file 122 to be opened. The routine 250 then proceeds from operation 252 to operation 254.

At operation 254, the called I/O function (e.g. fopen) searches the file cross-reference table 116 to determine if the filename 124 provided with the open request is specified therein. If the requested filename 124 is not contained in the file cross-reference table 116, the routine 250 proceeds from operation 256 to operation 262, where the standard I/O library function for opening a file on a mass storage device is utilized to obtain a file handle for the requested file. Storage operations can then be performed on the file on the mass storage device using the provided file handle.

If, however, the filename 124 of the requested file is contained in the file cross-reference table 116 (i.e. the filename 124 matches the filename 118 in the example shown in FIG. 1), this indicates that the requested file 112 is stored in a firmware volume 110 rather than on a mass storage device. Accordingly, if the filename 124 is listed in the file cross-reference table 116, the routine 250 proceeds from operation 256 to operation 258, where the GUID 114B associated with the filename 118 is retrieved from the file cross-reference table 116. The GUID 114B associated with the filename 118 is then utilized to read the requested file 112 from the firmware volume 110 and to obtain a file handle 126 to the file 112 at operation 260. The routine 250 then proceeds from operation 260 to operation 264.

At operation 264, the file handle 126 obtained at operation 260 or 262 is returned to the pre-boot application 106 in response to the request to open the file 112 (i.e. the call to the fopen function in the example shown in FIG. 1). As discussed above, the pre-boot application 106 can then utilize the file handle 126 to perform other types of file operations (e.g. "fseek" or "fread") on the file 112 stored in the firmware volume 110 in a traditional fashion. For example, and without limitation, the pre-boot application 106 can issue an "fread" request 128 using the standard I/O library 120. The routine 250 then proceeds from operation 264 to operation 266, where it ends.

Figure 3:
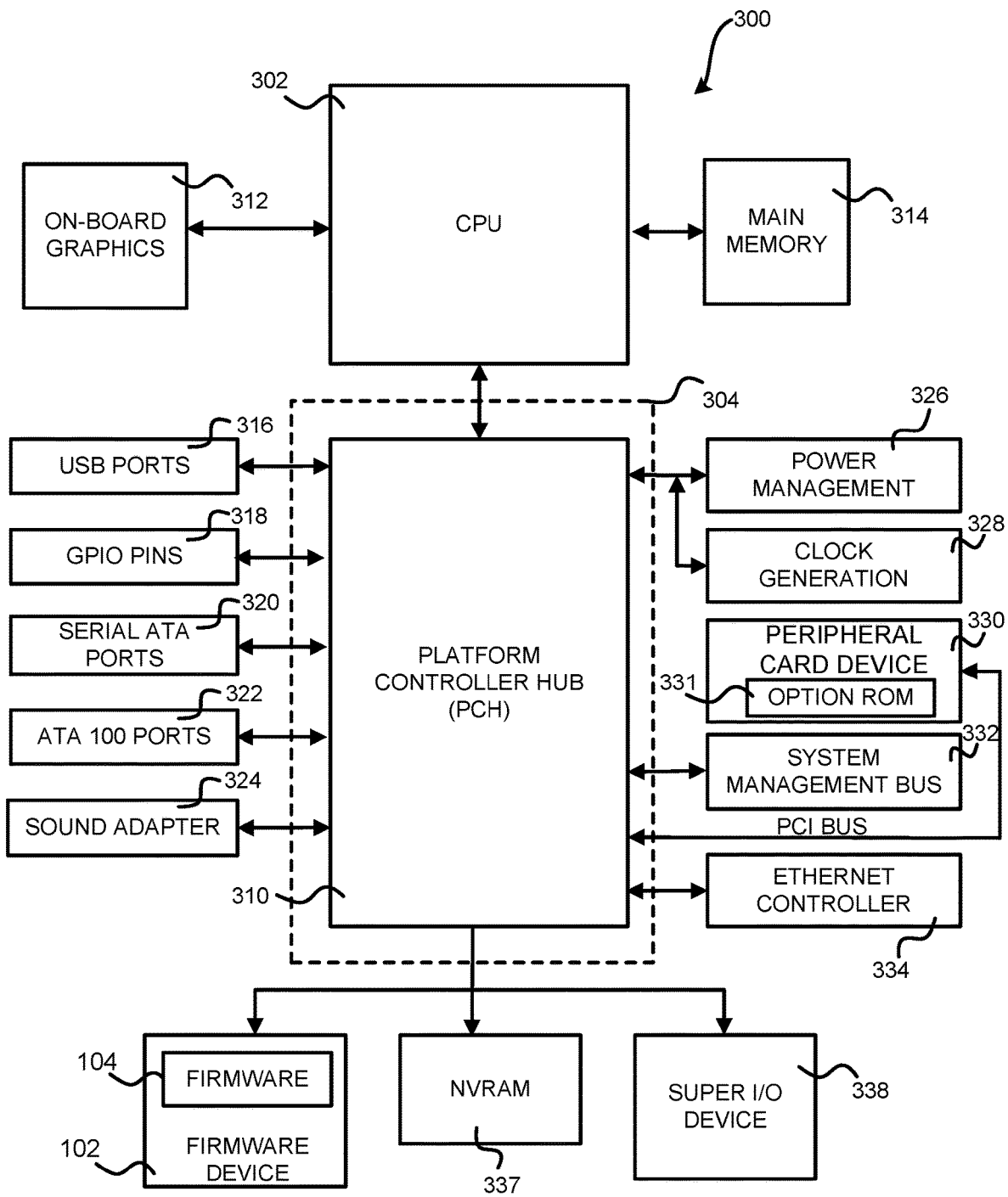
FIG. 3 is a computer architecture diagram that illustrates various components of a computing device that has configured to provide the functionality disclosed herein.

Referring now to FIG. 3, an illustrative computer architecture for a computer capable of implementing the various technologies discussed herein will be described. It should be appreciated that although the configurations described herein are discussed primarily in the context of a conventional desktop, laptop, or server computer, the configurations can be utilized with virtually any type of computing device that utilizes a firmware, such as a UEFI-compliant firmware, to control aspects of its operation.

In order to provide the functionality described herein, the computer 300 can include a baseboard, or motherboard (not shown in FIG. 3). The motherboard can be a printed circuit board to which some or all of the components shown in FIG. 3 can be connected by way of a system bus or other electrical communication path.

In one illustrative configuration, the motherboard includes one or more central processing units ("CPU") 302 configured to operate in conjunction with a chipset 304. The CPU 302 can be a central processor that performs arithmetic and logical operations necessary for the operation of the computer. For example, the CPU 302 might be a CPU available from INTEL CORPORATION, AND CORPORATION, or a CPU based upon the ARM architecture from ARM HOLDINGS. Other types of CPUs might also be utilized. In some configurations, the CPU 302 includes an interface to a random access memory ("RAM") used as the main memory 314 in the computer 300 and, possibly, to an on-board graphics adapter 312

In one implementation, the chipset 304 includes a platform controller hub ("PCH") 310. The PCH 310 provides an interface between the CPU 302 and the remainder of the computer 300. The PCH 310 can also provide functionality for enabling networking communication through an Ethernet controller 334. The Ethernet controller 334 is capable of connecting the computer 300 to another computer via a network. Connections that can be made by the Ethernet controller 334 can include local area network ("LAN") or wide area network ("WAN") connections. LAN and WAN networking environments are commonplace in offices, enterprise-wide computer networks, intranets, and the Internet.

The PCH 310 can also include components for controlling many of the input/output functions of the computer 300. In particular, the PCH 310 can provide one or more universal serial bus ("USB") ports 316, a sound adapter 324, the Ethernet controller 334, and one or more general purpose input/output ("GPIO") pins 318. The PCH 304 can also provide a system management bus 332 for use in managing the various components of the computer 300. Power management circuitry 326 and clock generation circuitry 328 can also be utilized during the operation of the PCH 310.

The PCH 310 can also provide a bus for interfacing peripheral card devices or add-in cards 330, such as a SCSI host bus adapter. In one configuration, the bus comprises a peripheral component interconnect ("PCI") bus. It should be appreciated that other types of add-in cards compliant with other types of bus standards might also be utilized. The add-in card 330 might also include an option ROM 331. As known to those skilled in the art, the option ROM 331 of an add-in card 330 contains program code executable by the CPU 302, such as a firmware driver that is used to connect the device to the system once the option ROM 331 is loaded.

The PCH 310 can also provide one or more interfaces for connecting mass storage devices to the computer 300. For instance, according to an configuration, the PCH 310 includes a serial advanced technology attachment ("SATA") adapter for providing one or more SATA ports 320 and an ATA100 adapter for providing one or more ATA100 ports 322. The SATA ports 320 and the ATA100 ports 322 can be, in turn, connected to one or more mass storage devices (not shown in FIG. 3) storing an OS and application programs. As known to those skilled in the art, an OS comprises a set of programs that control operations of a computer and allocation of resources. An application program is software that runs on top of the OS and uses computer resources made available through the OS to perform application-specific tasks.

The mass storage devices connected to the PCH 310 and the SCSI host bus adapter 330, and their associated computer-readable storage media, can provide non-volatile storage for the computer 300. In addition to these mass storage devices, the computer 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one particular example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPU 302 and executed, transform a general-purpose computing system into a special-purpose computing system customized to facilitate all, or part of, the operations disclosed herein. As detailed throughout this description, the program modules can provide various tools or techniques by which the computer 300 can participate within the overall systems or operating environments using the components, logic flows, and/or data structures discussed herein.

As also shown in FIG. 3, a low pin count ("LPC") interface can also be provided by the PCH 310 for connecting a "Super I/O" device 338. The Super I/O device 338 is responsible for providing a number of I/O ports, including, but not limited to, a keyboard port, a mouse port, a serial interface, a parallel port, and other types of I/O ports. The LPC interface can also connect a firmware device 102 such as a ROM, EPROM, or a flash memory such as a non-volatile random access memory ("NVRAM") for storing the firmware 104 that includes program code containing the basic routines that help to start up the computer 300 and to transfer information between elements within the computer 300. As discussed above, in one configuration the firmware 104 is a firmware that is compliant with the UEFI Specification. As also discussed above, the firmware device 102 can include the pre-boot application 106, the file cross-reference table 116, and the firmware volume 110.

The LPC interface can also be utilized to connect a NVRAM 337 to the computer 300. The NVRAM 337 can be utilized by the firmware 102 to store configuration data for the computer 300. The configuration data for the computer 300 can also be stored on the same device as the firmware 104 in some configurations.

The computer 300 can be implemented as an embedded control computer, a laptop, a server computer, a mobile device, a set-top box, a kiosk, a tablet or slate computing device, a vehicular information system, a mobile telephone, a customized machine, or other hardware platform. The CPU 302 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 302 can be constructed from transistors and/or other circuit elements, which can individually or collectively assume any number of states. More specifically, the CPU 302 can operate as a state machine or finite-state machine. Such a machine can be transformed to a second machine, or a specific machine, by loading executable instructions contained within the program modules. These computer-executable instructions can transform the CPU 302 by specifying how the CPU 302 transitions between states, thereby transforming the transistors or other circuit elements constituting the CPU 302 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 300 might not include all of the components shown in FIG. 3, can include other components that are not explicitly shown in FIG. 3, or can utilize an architecture completely different than that shown in FIG. 3.

Figure 4:
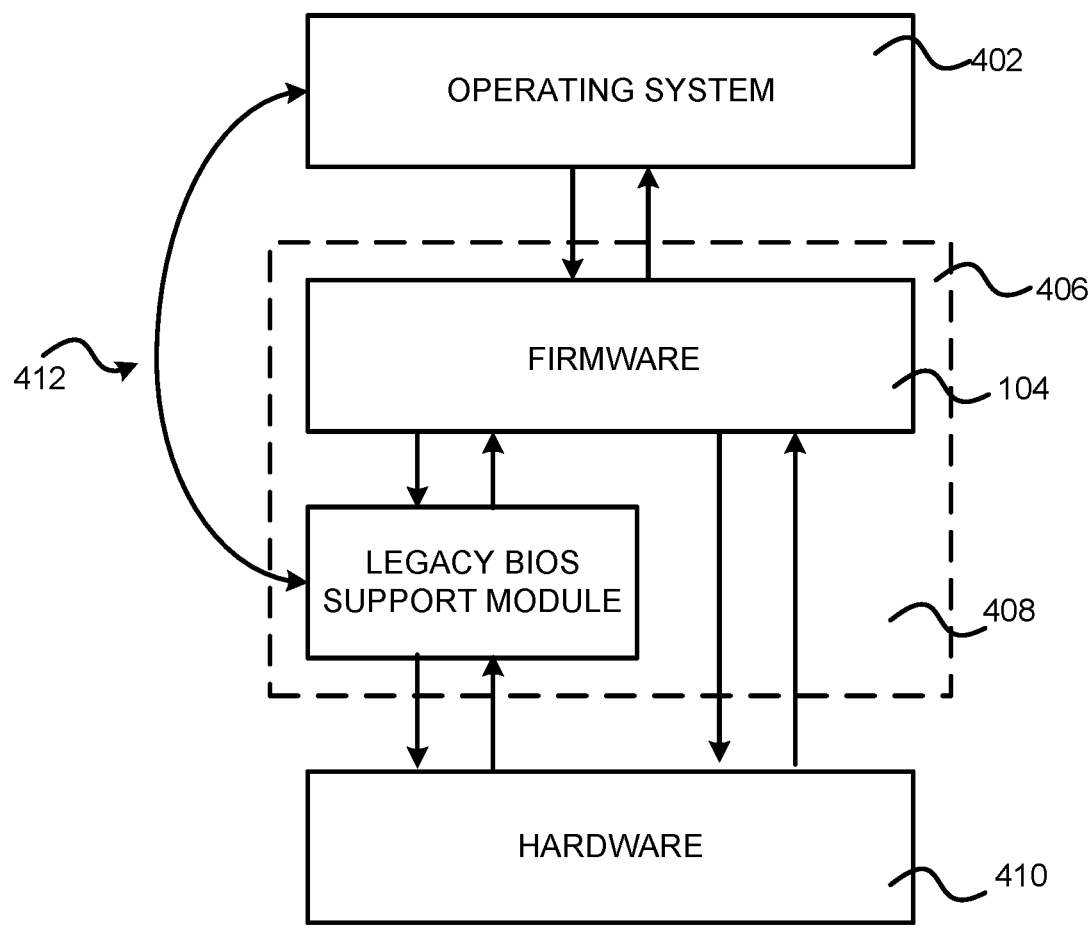
FIG. 4 is a software architecture diagram illustrating aspects of an interface between a UEFI Specification-compliant firmware and an operating system according to one or more configurations presented herein.

Referring now to FIG. 4, a software architecture diagram will be described that illustrates aspects of an interface between a firmware 104, such as a UEFI-compliant firmware, and an operating system 402 according to one or more configurations presented herein. As described above, a firmware 104 can include a UEFI-compliant firmware that is compliant with the UEFI Specification. As mentioned above, the term "UEFI Specification" as used herein refers to both the EFI Specification developed by INTEL CORPORATION and the UEFI Specification managed by the UEFI FORUM The UEFI Specification describes an interface between the operating system 402 and the firmware 104. The UEFI Specification also defines an interface that the firmware 104 can implement, and an interface that the operating system 402 can use while booting. How the firmware 104 implements the interface can be left up to the manufacturer of the firmware. The UEFI Specification also defines a way for the operating system 402 and firmware 104 to exchange information necessary to support the operating system boot process.

According to some configurations, both a UEFI-compliant firmware 104 and a legacy BIOS support module 408 can be present in the firmware 104. This allows the computer 300 to support a UEFI firmware interface and a legacy BIOS firmware interface. In order to provide this functionality, an interface 412 can be provided for use by legacy operating systems and applications. According to other configurations, only one of the UEFI-compliant firmware 104 and the legacy BIOS support module 408 are present in the firmware 406. According to yet other configurations, the firmware 104 can interface with the platform hardware 410 through any of various other architectures, components, or modules for the firmware without specific involvement of the UEFI-compliant firmware 104 or the legacy BIOS support module 408. Additional details regarding the operation and architecture of a UEFI Specification-compliant firmware can be found in the UEFI Specification which is available from the UEFI Forum, and which is expressly incorporated herein in its entirety.

Figure 5:
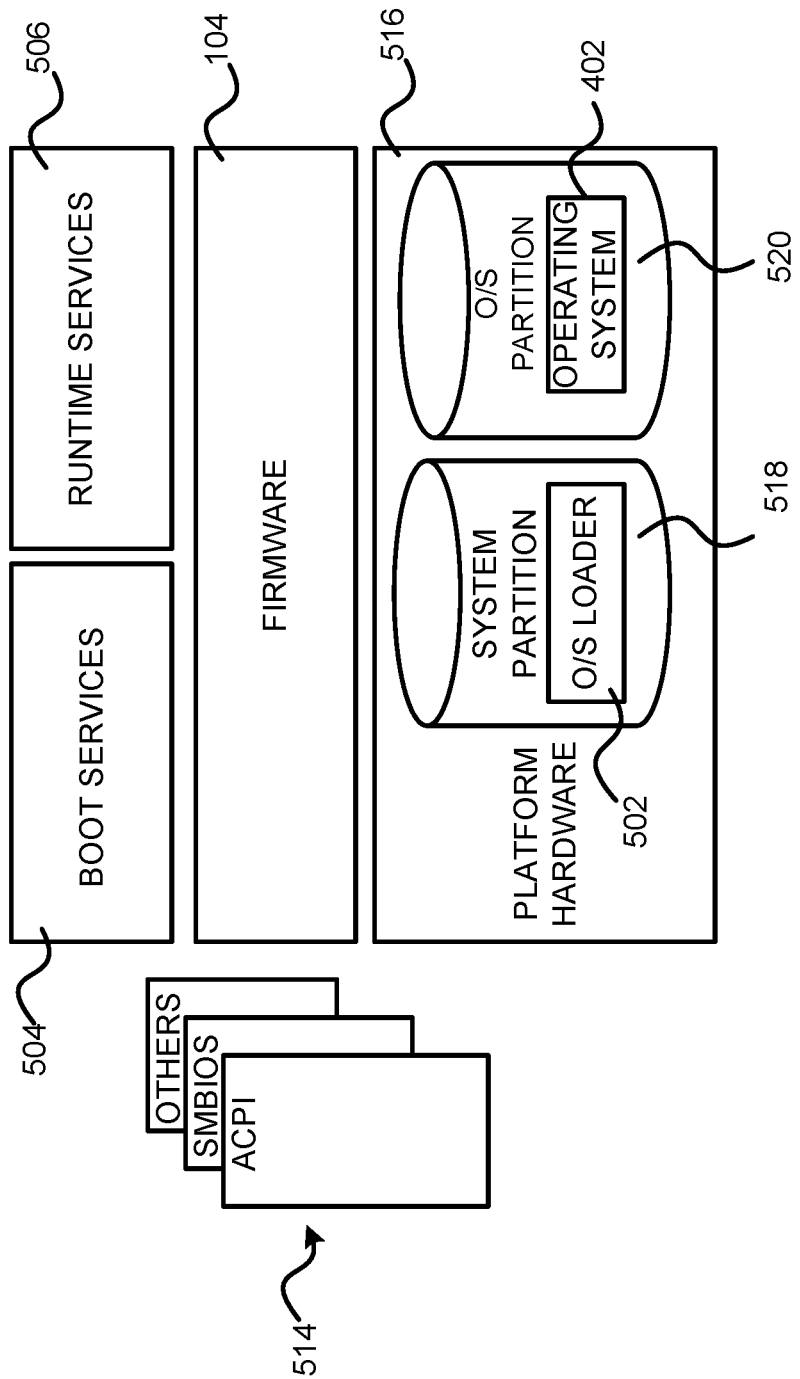
FIG. 5 is a software architecture diagram illustrating an architecture for a UEFI Specification-compliant firmware that provides an operating environment for one or more configurations presented herein.

Turning now to FIG. 5, a block diagram will be described that illustrates an architecture for a UEFI Specification-compliant firmware 104 that provides an operating environment for one or more configurations presented herein. As shown in FIG. 5, the architecture can include platform hardware 516 and an operating system 402. The firmware 104 can retrieve an operating system ("OS" or "O/S") loader 502 from the UEFI system partition 518, which in turn can load the operating system 402 from the O/S partition 520. The UEFI system partition 518 can be an architecturally shareable system partition that provides a file system designed to support safe sharing of mass storage between multiple vendors. The UEFI Specification defines the structure of the UEFI system partition 518.

Once started, the UEFI OS loader 502 can continue to boot the complete operating system 402. In doing so, the UEFI OS loader 502 can use UEFI boot services 504 and interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 504 can provide interfaces for devices and system functionality used during boot time. UEFI runtime services 506 can also be available to the UEFI OS loader 502 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services. The pre-boot application 106 also has access to these runtime and boot services.

It should be appreciated that technologies have been disclosed herein for enabling pre-boot applications to access files stored in a firmware volume. It should also be appreciated that while the subject matter presented herein has been described primarily in the context of a firmware execution environment provided by a UEFI Specification-compliant firmware, it is to be understood that the configurations disclosed herein are not limited to use with a UEFI Specification-compliant firmware. Similar configurations can be utilized in other firmware execution environments, such as that provided by a firmware compliant with the OPEN FIRMWARE specification or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A computer-implemented method for accessing a file stored in a firmware volume in a firmware device from a pre-boot execution environment, comprising:
receiving a request to open the file from a pre-boot application executing in the pre-boot execution environment, the request comprising a filename associated with the file;
responsive to the request, searching a file cross-reference table for the filename, the file cross-reference table comprising a mapping between filenames for firmware file system files stored in the firmware volume and globally unique identifiers associated with the filenames; and
responsive to determining that the filename is contained in the file cross-reference table,
retrieving a globally unique identifier associated with the filename from the file cross-reference table,
utilizing the globally unique identifier associated with the filename to obtain a file handle for the file,
returning the file handle to the pre-boot application in response to the request; and
responsive to determining that the filename is not contained in the file cross-reference table, obtaining the file handle for the file using one or more standard input/output library functions.

2. The computer-implemented method of claim 1, wherein the pre-boot application, the file cross-reference table, and the file are stored in the firmware device.

3. The computer-implemented method of claim 1, wherein the file cross-reference table further comprises a mapping between volume names for firmware volumes and globally unique identifiers for the firmware volumes.

4. The computer-implemented method of claim 1, wherein the filenames for the firmware file system files stored in the firmware volume are stored in the firmware file system files, and wherein the file cross-reference table is generated by
identifying files stored in the firmware volume, and
adding the filenames and the globally unique identifiers for the files stored in the firmware volume to the file cross-reference table.

5. The computer-implemented method of claim 1, further comprising using the file handle to perform one or more file operations on the file stored in the firmware volume.

6. The computer-implemented method of claim 5, wherein performing one or more file operations on the file stored in the firmware volume comprises performing one or more of a seek operation or a read operation using the standard input/output library functions.

7. The computer-implemented method of claim 1, wherein the pre-boot execution environment is provided by a unified extensible firmware interface (UEFI) compliant firmware.

8. A non-transitory computer-readable storage medium having computer-executable instructions stored thereupon which, when executed by a computer, cause the computer to:
receive a request to open a file from a pre-boot application executing in a pre-boot execution environment, the request comprising a filename associated with the file;
responsive to the request, search a file cross-reference table for the filename, the file cross-reference table comprising a mapping between filenames for firmware file system files stored in a firmware volume and globally unique identifiers associated with the filenames; and
responsive to determining that the filename is contained in the file cross-reference table,
retrieve a globally unique identifier associated with the filename from the file cross-reference table,
utilize the globally unique identifier associated with the filename to obtain a file handle for the file,
return the file handle to the pre-boot application in response to the request; and
responsive to determining that the filename is not contained in the file cross-reference table, obtaining the file handle for the file using one or more standard input/output library functions.

9. The computer-readable storage medium of claim 8, wherein the pre-boot application, the file cross-reference table, and the file are stored in a firmware device.

10. The computer-readable storage medium of claim 8, wherein the file cross-reference table further comprises a mapping between volume names for firmware volumes and globally unique identifiers for the firmware volumes.

11. The computer-readable storage medium of claim 8, wherein the filenames for the firmware file system files stored in the firmware volume are stored in the firmware file system files, and wherein the file cross-reference table is generated by
identifying files stored in the firmware volume, and
adding the filenames and the globally unique identifiers for the files stored in the firmware volume to the file cross-reference table.

12. The computer-readable storage medium of claim 8, having further computer-executable instructions stored thereupon to use the file handle to perform one or more file operations on the file stored in the firmware volume.

13. The computer-readable storage medium of claim 12, wherein the one or more file operations on the file stored in the firmware volume comprise one or more of a seek operation or a read operation using the standard input/output library functions.

14. The computer-readable storage medium of claim 8, wherein the pre-boot execution environment is provided by a unified extensible firmware interface (UEFI) compliant firmware.

15. An apparatus comprising:
a central processing unit (CPU); and
a firmware device storing a unified extensible firmware interface (UEFI)-compliant firmware which, when executed by the CPU, will cause the CPU to
receive a request to open a file from a pre-boot application executing in a pre-boot execution environment, the request comprising a filename associated with the file,
responsive to the request, search a file cross-reference table for the filename, the file cross-reference table comprising a mapping between filenames for firmware file system files stored in a firmware volume and globally unique identifiers associated with the filenames, and
responsive to determining that the filename is contained in the file cross-reference table,
retrieve a globally unique identifier associated with the filename from the file cross-reference table,
utilize the globally unique identifier associated with the filename to obtain a file handle for the file,
return the file handle to the pre-boot application in response to the request; and
responsive to determining that the filename is not contained in the file cross-reference table, obtaining the file handle for the file using one or more standard input/output library functions.

16. The apparatus of claim 15, wherein the pre-boot application, the file cross-reference table, and the file are stored in the firmware device.

17. The apparatus of claim 15, wherein the file cross-reference table further comprises a mapping between volume names for firmware volumes and globally unique identifiers for the firmware volumes.

18. The apparatus of claim 15, wherein the firmware device has further computer-executable instructions stored thereupon to use the file handle to perform one or more file operations on the file stored in the firmware volume.

19. The apparatus of claim 18, wherein the one or more file operations on the file stored in the firmware volume comprise one or more of a seek operation or a read operation using the standard input/output library functions.

20. The apparatus of claim 15, wherein the pre-boot execution environment is provided by the unified extensible firmware interface (UEFI) compliant firmware.

* * * * *